CHARLES F. JACOBSEN.
Illuminating-Sign.

No. 127,059.

Patented May 21, 1872.

Witnesses.
G. Mathys.
Thos. D. D. Curand

Inventor:
Charles F. Jacobsen
Per
Attorneys.

127,059

UNITED STATES PATENT OFFICE.

CHARLES F. JACOBSEN, OF NEW YORK, N. Y.

IMPROVEMENT IN ILLUMINATING SIGNS.

Specification forming part of Letters Patent No. 127,059, dated May 21, 1872.

Specification describing an Improvement in Night-Signs or Illuminators, invented by CHARLES F. JACOBSEN, of New York, in the county of New York and State of New York.

The invention consists in an improved night-sign, composed of a central glass, a circular glass-plate there around, a flanged case and rim, a burner, and a concave reflector, arranged as hereinafter described.

Figure 1:
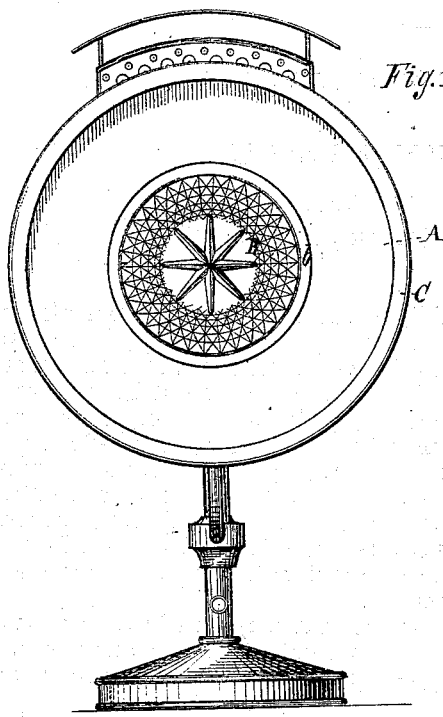
Figure 2:
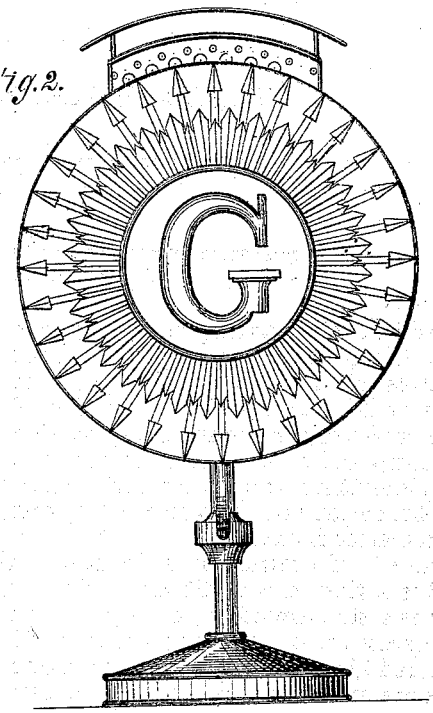
Figure 3:
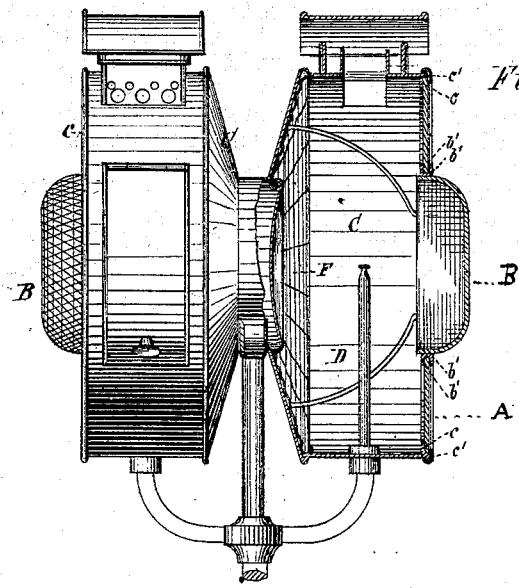

Figure 1 of drawing is a front elevation. Fig. 2 is a view of a modification of the front. Fig. 3 is a side elevation partly in section.

A represents an annular plate made of red or colored glass on which the letters or characters are arranged. B is a glass concave on the inner side, and convex on the outer side, around and to the rim of which the plate A is attached. The convex face of this glass is preferably formed of prisms. The letters may be made on this glass, and painted prisms may be substituted for the colored glass. C is the case provided near the outer end with two ribs or flanges, $c$ $c'$, between which the red glass A is held. The outer flange $c'$ is detachable so that the glass may be easily removed. The prism-glass B is rigidly set in a rim, $b$, which is provided on its outer edge with flanges $b'$ $b'$, between which the annular glass A is fitted. In middle of the bottom of case C is placed a burner, D, of any suitable kind. On the back of case is located a concave reflector, F, formed of polished metal or other suitable substance. The rays of light from the burner, which shine rearwardly, are caught by the reflector, reflected back through the glass A or prism glass B, and made to combine with the direct rays thrown out in front. In this manner I secure a very powerful light that exhibits the letters or characters vividly, at a short or long distance.

I am aware that reflectors have been used in locomotive headlights, in connection with a lamp, but these form no part of my invention.

What I do esteem as my invention, and desire to protect by Letters Patent, is—

As an article of manufacture, a night-sign consisting of glass plate A, glass B, case C having flanges $c$ $c'$, rim $b$ having flanges $b'$, burner D, and concave reflectors F, all constructed and arranged as and for the purpose described.

CHAS. F. JACOBSEN.

Witnesses:
SOLON C. KEMON,
THOS. D. D. OURAND.